March 31, 1942.  W. H. OSBORN  2,278,135

PRESS

Filed Aug. 2, 1940  2 Sheets-Sheet 2

INVENTOR
WILLIAM H. OSBORN
BY Paul R. Ames
ATTORNEY

Patented Mar. 31, 1942

2,278,135

UNITED STATES PATENT OFFICE 2,278,135

PRESS

William H. Osborn, New York, N. Y., assignor to Phelps Dodge Corporation, New York, N. Y., a corporation of New York Application August 2, 1940, Serial No. 349,971

17 Claims. (Cl. 266—37)

This invention relates to an improvement in presses and particularly to a press suitable for use as a dross press.

In the refining of relatively low melting point metals such as tin or lead or lead-tin compositions known as solder, the practice of fire refining causes various drosses to rise to the surface of the kettle in which the metals are being refined. These drosses carry with them much entrained molten metal which can be partly removed by pressing or squeezing the dross.

The removing of antimony from tin or solder metals with aluminum or sodium may be cited as an example of the production of such a dross. To a pot or kettle of tin or solder containing antimony, metallic aluminum or sodium may be added and stirred into the charge. An intermetallic compound of aluminum or sodium and antimony is formed which has a high melting point and which rises to the surface of the kettle in the form of a mushy dross in which solid crystals of aluminum-antimony or sodium-antimony compound are found with large amounts of molten tin or solder metal entrained among them. Such a dross will contain in the neighborhood of 8% antimony and 2 to 3% aluminum, or sodium, the balance of the dross being tin or solder metal.

Relatively low pressures, such as may be exerted by the action of air on a hydraulic press cylinder against a mold into which this dross is charged, will squeeze out much of the entrained metal. For example, pressures of the order of magnitude of 160 to 200 pounds per square inch will squeeze out sufficient tin from an 8% antimony dross to bring the antimony up to approximately 20%. The use of higher unit pressures on such a dross at temperatures above the melting point of the mother metal and below the freezing point of the compounds of the dross itself will squeeze out further amounts of the mother metal. For example, an antimony-aluminum dross which has already been pressed at pressures of 160 to 200 pounds per square inch so that it contains approximately 20% antimony, may be introduced into a high pressure hydraulic press and mold where pressures of the order of magnitude of 25,000 to 30,000 pounds per square inch may be applied to squeeze out further tin or solder metal and leave a final cake containing as much as 50% antimony and 15 to 20% aluminum, the remaining 30 to 35% being tin or solder metal. The cake may be further refined for the separation of antimony, for example, by selective oxidation, as described in my copending application Serial No. 347,641, filed July 26, 1940, entitled "Recovery of antimony."

It is an object of this invention to provide an improved press, and method of operating the same, particularly adapted for the pressing or squeezing of drosses. A further object of the invention is to provide an improved press and method of operating the same to produce a multiplicity of cakes of squeezed dross, which cakes are in a shape and form which make it easy to introduce them into the container of a high pressure hydraulic press for further squeezing. Another object is to provide a press having means for moving the mold head by the press head, whereby close contact may be maintained during the pressing, said mold head being also movable separately from the press head whereby the ejection of the press cakes may be facilitated. It is also an object to provide a press with means for dropping the press head into the bath under the dross and to then lower the molding head through the dross and onto the press head so as to partially or completely fill the mold with dross. Other objects will become apparent.

The attached drawings illustrate a form of press embodying the invention. Figure 1 is a vertical cross sectional view at the diameter of the press cylinder, the pistons and piston rods being shown in elevation, and portions being broken away to indicate greater length.

Figure 1:
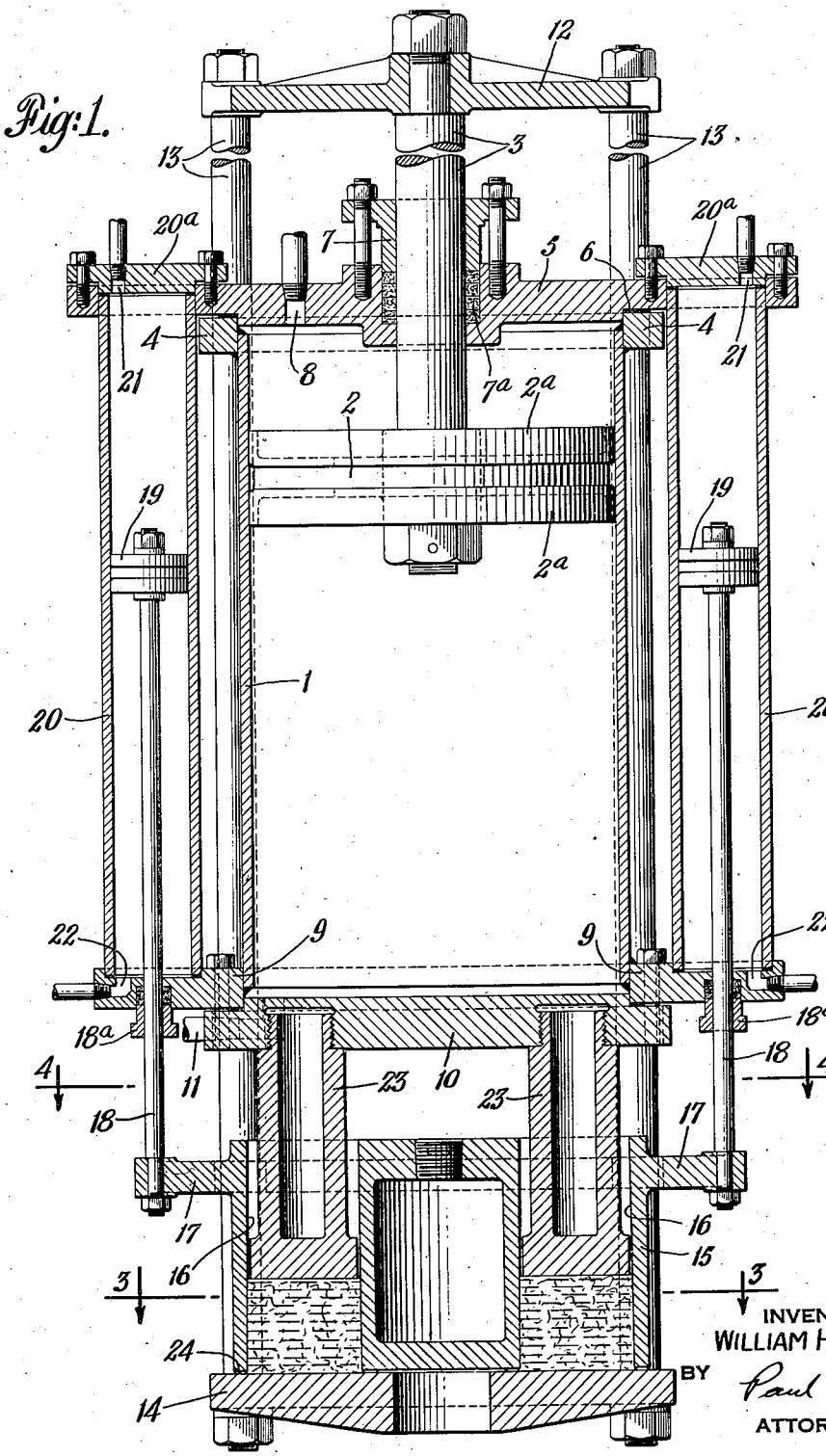

In the drawings, 1 is an air cylinder (about 20 inches in diameter) equipped with a double acting piston 2, to which there is attached a piston rod 3. The piston may be provided with any suitable packing such, for example, as the cup leathers 2a. The upper end of the cylinder is welded or otherwise fastened to a flange ring 4, to which the top cover plate 5 is bolted or otherwise fastened, suitable sealing means being provided as indicated at 6. This cover plate 5 is provided with suitable packing means, such as the packing gland 7, pressing against the packing material 7a, through which the piston rod 3 passes. It is also provided with an aperture 8 communicating with a valved pipe for supplying and withdrawing air or other fluid pressure medium used for actuating the press.

The lower end of the cylinder 1 is welded or otherwise fastened to the ring flange 9, which has bolted, or otherwise fastened to it, the bottom closure plate 10. This bottom closure plate is provided with an aperture and a valved conduit 11 for the inlet and outlet of air or other fluid pressure medium.

The piston rod 3 is connected to a cross head 12 carrying a rod 13 at each of its four corners. These rods extend downwardly through the closure plates 5 and 10 and at their lower ends extend through and support the bottom cross head plate 14. With this arrangement, by actuating the piston 2, the bottom cross head plate of the press may be raised or lowered.

Between the bottom closure plate 10 and the cross head plate 14, there is positioned the molding head 15 containing a plurality of substantially cylindrical passages 16 which may be slightly tapered outwardly toward their lower ends, if desired, to facilitate the removal of the press cake (although this taper should not be sufficient to permit a squeezing of an undesirable amount of the metal between the plungers and cylinders). The molding head 15 is provided with a flange 17 projecting at each side and connected to the piston rods 18, 18 of the pistons 19, 19 positioned within the cylinders 20, 20 and having suitable packing means, such as cup leathers, like those on the piston 2. These cylinders 20, 20 rest upon the flange 9 and are closed and retained in position by closure plates 20a, 20a bolted to the upper closure plate 5, or by other suitable means. These closure plates 20a, 20a are each provided with an opening 21 for the controlled inlet and outlet of air or other fluid pressure medium and the flange 9 is provided with apertures and valved pipes, as indicated at 22, 22, for the same purpose.

Packing glands 18a, 18a are provided in the flange 9 to seal the piston rods 18, 18.

A plurality of plungers 23, one for each of the cylinders 16, are screwed into or otherwise attached to the closure plate 10 in position to project into the cylinders 16. The central portion of the plungers 23, the molding head 15 and the cross head plate 14 are made hollow to reduce their weight.

The whole press may be suspended, by means of hooks attached to the flange 4, from any suitable rack, such as a jib crane, by which the press may be swung over the kettle with which it is to be used, or it may be supported in other suitable ways.

In operating the apparatus the press may be swung over the kettle containing the molten metal and dross that is to be squeezed, with the piston 2 and the pistons 19, 19 in their upper positions. Air or other pressure fluid is then introduced through the aperture 8 and the piston 2 is actuated to lower the bottom plate 14 into the kettle. At the same time, or later, air or other pressure fluid is introduced through the apertures 21, 21 into the cylinders 20, 20 so as to lower the molding head 15 into the kettle and allow it to rest on the bottom plate cross head 14. Of course, if the weight of the moving parts is sufficient, the force of gravity may be adequate to lower the plate 14 and the molding head 15 into the molten metal in the kettle, in which event it will be only necessary to vent the air or other pressure fluid through the outlets 11 and 22.

If the plate 14 is lowered into the molten mass ahead of the molding head 15, the cylinders will be partially or entirely filled with dross and molten metal. If further filling is desirable, it may be done by ladling the dross into the cylinders.

Figure 2:
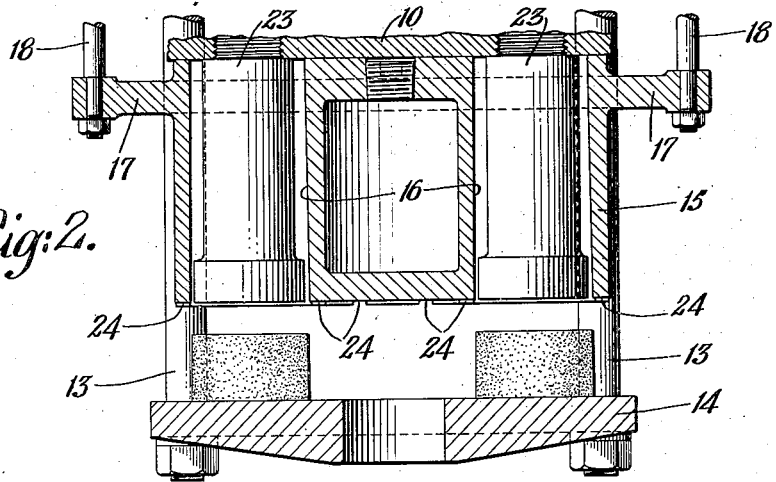
Figure 2 is a similar view of the lower portion of the press with the press opened for removal of the press cake.
Figure 3:
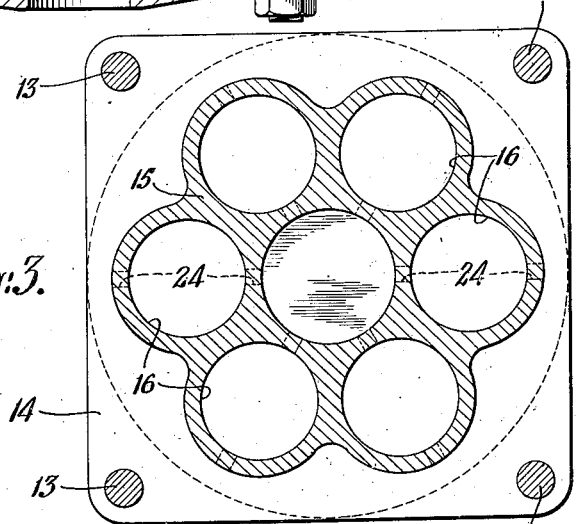
Figure 3 is a horizontal sectional view taken on the line 3—3 of Figure 1.
Figure 4:
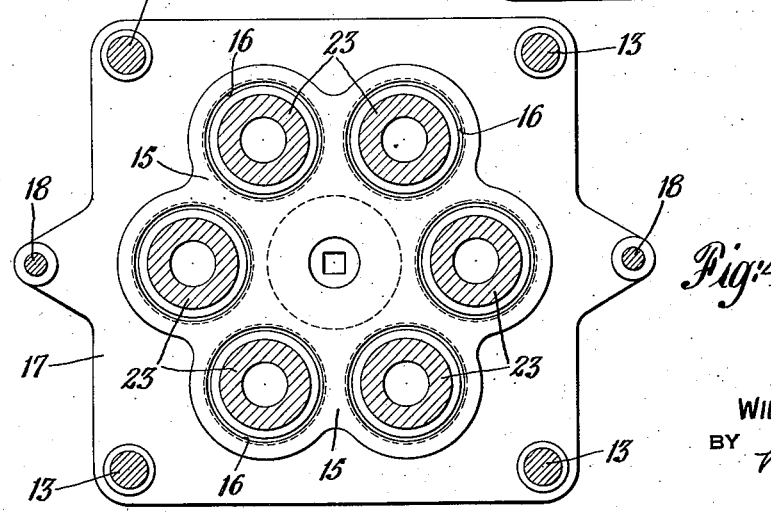
Figure 4 is a horizontal sectional view taken on the line 4—4 of Figure 1.

When the molds are filled to the desired level air or other fluid pressure medium is introduced into the cylinder 1 through the aperture 11, while venting the pipes 8 and 21, 21, to cause the bottom cross head plate 14 and the molding head 15 to move upwardly, whereby the plungers 23 will move into the cylinders 16, thus exerting a pressure on the dross in the mold head. It is preferred to have the plate 14 lift the molding head 15 in order to assure a close contact between the plate 14 and the cylinders 16 and for this purpose air is introduced through 11 while keeping apertures 8, 81 and 22 on release. If air is admitted at 22, it should be at a rate which would lift the mold head at a slower rate than the upward movement of the cross head 14. The molten metal extruded from the dross will flow out of the mold head through the small grooves 24, about 1/64 of an inch deep, in the bottoms of the cylinder walls of the molding head 15 or other suitable openings. When the maximum desired pressure of the main cylinder 1 has been exerted on the dross in the mold cylinders 16 through the upward motion of the plate 14, the pressure beneath the piston within the cylinder 1 is released and, at the same time, the pressure beneath the pistons 19, 19 is increased to raise the molding head 15, whereby the motion of the molding head 15 relative to the pistons 23 will eject the press cakes from the cylinders 16 onto the head 14. If necessary, the head 14 may be lowered relative to the plungers 23, as illustrated in Figure 2, to facilitate the removal of the press cakes. The press cakes can then be pushed off into any suitable receptacle or platform for further treatment such, for instance, as in a higher pressure press and/or by selective oxidation, or for storage. The plate 14 can then be returned to its starting position.

It is preferred to position the press so that the fixed plungers 23 are above the level of the molten material in the kettle, the rods 3 and 13 being long enough to permit the plate 14 and molding head 15 to dip into the molten bath. As the plungers 23 progress into the cylinders 16 the extruded material will fall back into the kettle.

In the apparatus illustrated, using air at one hundred pounds per square inch gauge pressure, the main cylinder will exert a total pressure of slightly over 30,000 pounds, which, when divided among the six molds 16, having diameters of 5 7/8 inches, will produce a unit pressure on each mold of about 190 pounds per square inch. It will be readily seen that the diameter and size of the mold units may be varied to produce such other unit pressures as may be desired.

It is obvious that many modifications may be made in the apparatus and in the use of the apparatus in utilizing the invention and it is not intended to restrict it to the particular apparatus or use shown and described. For example, the shape and sizes of the molds may be varied or different means, such as a positive mechanical drive, may be provided for actuating the molding head and press plate. Also, if preferred in the use of the press, it may be removed from the kettle before the pressure is applied and positioned in or over another receptacle so that the extruded molten metal will flow into the other receptacle as the pressure is applied. Also, if desired, the plungers 23 may be submerged and the pressure may be applied while the molding head is submerged so as to extrude the molten material under the surface of the liquid. Of course, the press may be used for the pressing of materials other than the dross which has been referred to as illustrative. For example, it may be used in the pressing operation described in Patent No. 2,206,117. Obviously, many other modifications may be made in the construction and use of the apparatus to meet particular requirements of such other uses.

The terms used in describing the invention have been used in their descriptive sense and not as terms of limitation and it is intended that all equivalents thereof be included within the scope of the appended claims.

I claim:

1. In a press, a plunger fixed in relation to the body of the press and extending downwardly therefrom, a mold head surrounding said plunger and movable relative to it, to advance and retract said plunger in said mold head, and a press head movable toward and away from said plunger independently of said mold head, said mold head and press head being actuated by means positioned above the said plunger.

2. In a press, a plunger fixed in relation to the body of the press and extending downwardly therefrom, a mold head surrounding said plunger and movable relative to it, to advance and retract said plunger in said mold head, and a press head movable toward and away from said plunger with and independently of said mold head, said mold head and press head being actuated by means positioned above the said plunger.

3. In a press, a plunger fixed in relation to the body of the press and extending downwardly therefrom, a mold head surrounding said plunger and movable relative to it, to advance and retract said plunger in said mold head, and a press head adapted to form a closure for the lower end of said mold head and movable toward and away from said plunger with and independently of said mold head, said mold head and press head being actuated by means positioned above the said plunger.

4. In a press, a plurality of plungers fixed in relation to the body of the press and extending downwardly therefrom, a mold head having a plurality of cylinders each surrounding one of said plungers, said mold head being movable relative to said plungers to advance and retract said plungers in said cylinders; and a press head movable toward and from said plungers independently of said mold head, said mold head and press head being actuated by means positioned above the said plungers.

5. In a press, a plurality of plungers fixed in relation to the body of the press and extending downwardly therefrom, a mold head having a plurality of cylinders each surrounding one of said plungers, said mold head being movable relative to said plungers to advance and retract said plungers in said cylinders; and a press head movable toward and from said plungers with and independently of said mold head, said mold head and press head being actuated by means positioned above the said plungers.

6. A press as defined in claim 1 in which the mold head and press head are actuated by air pressure.

7. A press as defined in claim 1 in which the mold head and press head are actuated by independent air pressures.

8. A dross press comprising a plurality of plungers fixed to the body of the press and extending downwardly therefrom, a mold head having a plurality of cylinders, each surrounding one of said plungers, said mold head being movable relative to said plungers to advance and retract said plungers in said cylinders, and a press head adapted to close the lower end of said cylinders and to move toward and from said plungers independently of said mold head, said mold head and press head being actuated by means positioned above the said plungers.

9. A dross press comprising a cylinder containing a piston adapted to reciprocate in it, fluid means for actuating said piston in said cylinder, a plunger in fixed relation to and beneath said cylinder, a mold head having a conduit adapted to surround said plunger and move relative to it to advance and retract said plunger in said conduit, a cylinder, positioned above said plunger, with a reciprocating piston in it for actuating said mold head, fluid means for actuating said last mentioned piston, a press head adapted to form a closure for the lower end of the conduit in the mold head, said press head being actuated by said first mentioned piston to move toward and from said plunger.

10. A dross press comprising a cylinder containing a piston adapted to reciprocate in said cylinder, means for admitting compressed gas to said cylinder to reciprocate said piston, a plurality of plungers in fixed relation to and beneath said cylinder, a mold head having a plurality of cylinders, each tapered outwardly toward its outlet end and adapted to surround one of said plungers, a plurality of cylinders positioned above said plungers and having pistons adapted to reciprocate in them, means for admitting compressed gas to said last mentioned cylinders to reciprocate said last mentioned pistons, means connecting said mold head to said last mentioned pistons so that the reciprocation of said pistons will advance and retract said plungers in the cylinders in said mold head, a press head adapted to form a closure for the lower ends of said cylinders in the mold head, and means connecting said press head to said first mentioned piston to move said press head toward and from said plungers with the reciprocations of said first mentioned piston.

11. A method for separating molten metal from dross, comprising fixing a plunger above the surface of the molten bath having a layer of dross thereon, lowering a press head into said molten bath, lowering a mold head into said molten bath toward said press head, thereby filling dross into said mold head, and raising the press head and mold head to advance said plunger into said mold head and extrude the molten metal from the dross into the molten bath.

12. A method for separating molten metal from dross, comprising fixing a plunger above the surface of the molten bath having a layer of dross thereon, lowering a press head and cylinder into said molten bath, filling dross into said cylinder, raising the press head and cylinder to advance said plunger into said cylinder and extrude the molten metal from the dross into the molten bath, and continuing the advance of said cylinder to expel the press cake from said cylinders onto said press head.

13. A method as defined in claim 11 in which the mold head is raised by the press head to advance the plunger into the mold head.

14. A method as defined in claim 12 in which the cylinder is raised by the press head to advance the plunger into the cylinder and the further advance of the cylinder to expel the press cake is independent of the movement of the press head.

15. In a press, a plunger fixed relative to the body of the press and extending downwardly therefrom, and a press head and a mold head each actuated independently of the other by means positioned above said plunger to move relative to said plunger to advance and retract said plunger in said mold head and to move said press head toward and from said plunger.

16. In a press, a plunger fixed relative to the body of the press and extending downwardly therefrom, and a press head and a mold head each actuated independently of the other by means positioned above said plunger to move with and independently of the other relative to said plunger, to advance and retract said plunger in said mold head and to move said press head toward and from said plunger.

17. In a press, a plunger fixed relative to the body of the press and extending downwardly therefrom, a mold head and a press head adapted to serve as a closure for the lower end of said mold head, each actuated independently of the other through double acting cylinders positioned above the said plunger, to move relative to said plunger to advance and retract said plunger in said mold head and to move said press head toward and from said plunger.

WILLIAM H. OSBORN.